United States Patent Office 3,209,704
Patented Oct. 5, 1965

3,209,704
DIESEL LOCOMOTIVES
Jean Louis Gratzmuller, 66 Blvd. Maurice Barres,
Neuilly sur Seine, France
Filed May 3, 1963, Ser. No. 277,836
Claims priority, application France, May 10, 1962,
897,148
10 Claims. (Cl. 105—35)

Diesel engines are being used to an increasing degree for rail traction and form the equipment of very many locomotives and autorail cars. Different transmission systems are used in this application: electric transmissions, hydraulic transmissions, mechanical transmissions.

The first two types of transmission have the advantage of a substantially continuous variation in the speed ratio and enable the problem of starting to be easily resolved, but they have a low efficiency and are heavy. The mechanical transmissions, if they are designed especially for rail traction and particularly if they are of the type described in the French patent filed on November 9, 1961 in the name of the same inventor for "Improvements in Change-Speed Gears" may have a staging comparable to that of the electric or hydraulic transmissions, which are those most currently employed, and they have in addition the advantage of a much higher efficiency.

However, if the starting problem proper is easily resolved, as has previously been indicated, with the first two types of transmission (although with a considerable loss of power in the case of diesel-hydraulic locomotives), it has only been so far possible to resolve this problem, in the case of strictly mechanical transmissions, by means of a slipping member or clutch which it is difficult to provide in good conditions for engines of several thousand horsepower.

The present invention has for its object to provide a simple solution to the starting problem of diesel locomotives with mechanical transmission, which solution is less costly and in addition makes it possible firstly to improve the running conditions of the diesel engine and secondly to provide certain other advantages which will be more clearly apparent from the following description.

The present invention is concerned with a diesel locomotive comprising an independent auxiliary group formed by a heat engine, an electric current generator and an electric driving motor, means being provided for permitting the locomotive to be driven either by means of the main diesel engine or engines usual for hauling purposes, or by the aforesaid independent group.

In a locomotive according to the invention the main function of the auxiliary group is to bring the locomotive and the train which it is hauling from the zero speed to the lowest speed at which the main engine can drive the train, without it being necessary to provide a slipping clutch, the mechanical gearbox being of course in the first gear ratio. This means that in practical use, with a gearbox in which the extreme gear ratios have a sufficient range (for example 1:10 or 1:15) and with a diesel engine supplying a sufficient power for running conditions of the order of ⅓ or ⅕ of its normal running conditions, the starting function of the auxiliary group consists in bringing the train from a stationary position to a speed of the order of 2 to 3 kilometres per hour.

This auxiliary group thus only requires to have a reduced power, for example, of about 10% of the power of the main engine or engines. Furthermore, the electric motor is used under excellent conditions, since it only operates with very small speed ranges, whereby it is easy to select for it the characteristics of its torque as a function of the speed which gives a high value to the coefficient of adherence of the driving wheels.

In other words, it can be stated that the invention consists in causing the locomotive to function as a diesel-electric locomotive on starting (operational period when this transmission system has the most advantages) and then, once the train is running, as a diesel locomotive with mechanical transmission, by which it is possible to benefit from the good efficiency of this type of transmission throughout the period when the train is running.

According to a first embodiment, the independent group is arranged in such a way as to be able to drive the locomotive directly by being connected in parallel with the normal traction group.

According to another embodiment, the electric motor of the independent group drives the locomotive through the shaft of the traction diesel engine. With this latter arrangement, while driving the locomotive from the zero speed up to the speed at which the drive may be assured by the diesel engine without interposition of a slipping member or clutch, the electric motor ensures the lubrication of the main diesel engine, causes the temperature inside this engine to rise and thus makes it more suitable for starting when it is started at the speed which is suitable for it.

It is thus seen that, according to the invention, the independent auxiliary group is able to achieve other functions than that which consists of putting the locomotive under way.

This system of starting the main diesel engine makes it possible to dispense with the costly and bulky starting battery which has so far been used, since it is sufficient to provide only a much smaller and less costly starting system for the auxiliary group.

According to one advantageous arrangement of the invention, and preferably in the case last described, a free wheel is provided between the electric motor and the diesel engine shaft.

According to one embodiment, the independent group is used for supplying the various accessory equipment provided on the locomotive.

According to yet another embodiment, means are provided for disconnecting the electric motor once the locomotive is moving by being driven by its usual diesel traction group and to direct the current supplied by the generator into the coaches for supplying the heating, more especially as described in the patent application of the same inventor filed on May 9, 1962, for "Improvements In Trains."

During a quite considerable part of their service, the locomotives only operate at low power (manoeuvres at low speed, running, light, etc.) so that in certain cases, the diesel-electric running by means of the auxiliary group may not be limited only to starting periods, and this is an additional advantage, because the diesel engines are not very suitable for operating for long periods under light load.

The invention will be better understood from reading the detailed description which follows and from considering the accompanying drawings, which illustrate certain embodiments of the invention as non-limitative examples.

Figure 1:
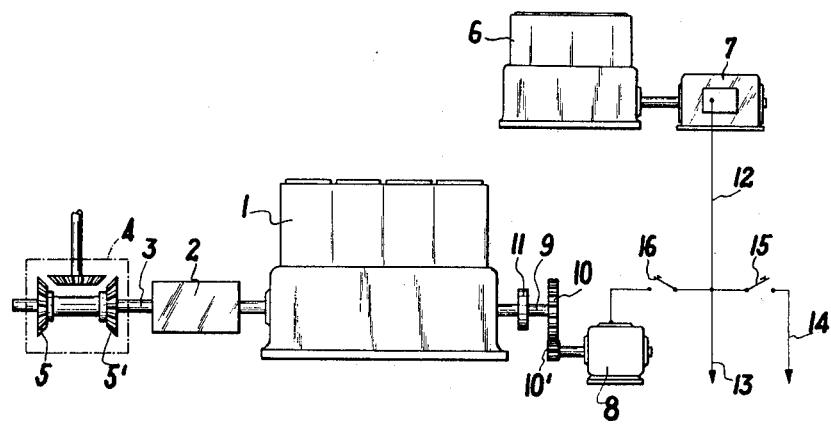
FIG. 1 shows diagrammatically the installation of the main units on a locomotive according to the invention.

The shaft of the main diesel engine 1 is coupled to a mechanical gearbox 2, the output shaft 3 of which drives the driving wheels, for example by means of a bevel gear 4 serving at the same time as a reversing gear. According to the diagrammatic view of the gear 4, the pair of bevel pinions 5–5′ can slide on the shaft 3, which gives the two directions of travel, with a neutral position in the centre.

The auxiliary group is formed by a diesel engine 6 coupled to an electric generator 7 which supplies an electric driving motor 8 which drives the shaft 9 of the main diesel engine 1 by means of a reduction gear 10–10′ and a free wheel 11.

Various circuits may be connected to the electric line 12 of the generator 7, for example, a circuit 13 supplying the accessory services of the locomotive (ventilation, lubrication, etc.,) and a circuit 14 supplying the accessory services of the train and particularly the electric radiators in the passenger coaches.

It is seen that the auxiliary motor-generator group 6–7 may be located at any suitable position on the locomotive, since its connection with the main engine is strictly electrical.

The auxiliary group has three functions: to get the train under way and to start the main diesel engine (temporary function), to supply the auxiliary services (permanent function) and finally to supply heating (a service which can be interrupted).

It is thus seen that the power of the auxiliary diesel may be established so as to ensure simultaneously two of these functions only.

By way of example, it may be mentioned that with a main engine of about 3000 H.P., the auxiliary services require about 200 H.P. and starting until a speed of about 3 km. per hour is reached takes about 300 H.P. It is thus possible to adopt an auxiliary group in the range of 500 H.P., the power available outside the starting periods making it possible to ensure the heating of the train.

The various operational phases are as follows: when the train is stopped at the station, only the auxiliary diesel 6 is running and supplies the heating circuit 14 of the train as well as certain auxiliary services of the locomotive by way of the line 13. In order to start, the reversing gear 4 is brought to the required position and the electric traction motor 8 is supplied. The starting is effected as on a diesel locomotive with electric transmission, for example by means of a controller with successive contacts. The motor 8 drives the wheels and at the same time causes the main engine 1 to turn idly, which is cleaned, lubricated and possibly reheated through a branch from the water circulation of the auxiliary engine 6. A manual or automatic device permits the heating circuit to be disconnected, by opening the switch 15, if the current intensity delivered by the generator 7 reaches the provided maximum value, this heating circuit only being resupplied when the traction motor 8 is no longer absorbing any power.

The locomotive is thus set moving, with a good value as regards adherence of the driving wheels, because of the characteristics of the traction motor 8 and as soon as speed is sufficient (for example, in the region of 2 to 3 km. per hour, depending on the load being hauled and the gradient of the track), the injection of the main diesel engine 1 is opened, and this becomes operative instead of inoperative. This engine is then accelerated and the speeds are successively reached. The electric traction motor 8 is thus operating idly, because of the free wheel and it is then possible manually or automatically to open the switch 16 and close the switch 15 in order to reestablish the heating circuit. Under normal running conditions, the auxiliary group continues to function, thereby supplying the auxiliary services of the locomotive and the heating system, if required.

Figure 2:
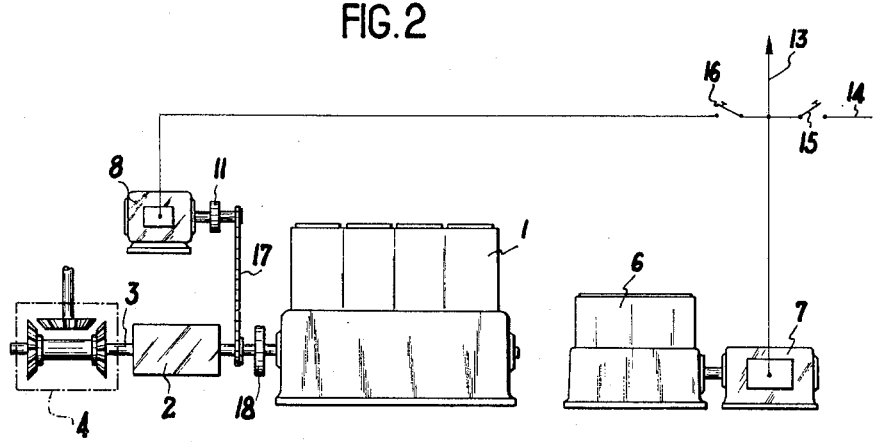
FIG. 2 shows another embodiment of the invention.

In the embodiment illustrated in FIG. 2, the electric traction motor 8′ acts on the main group in parallel with the main engine, through the intermediate shaft between the main engine 1′ and the gearbox 2′, for example, by a chain or like transmission 17 which comprises at least one free wheel 11′, another free wheel 18 being interposed on the shaft of the main engine.

The functioning of the locomotive is identical with that which has been described in the preceding case.

It is obvious that the invention is not in any way limited to the examples described and illustrated and it is capable of numerous variations available to the person skilled in the art, depending on the proposed applications, and without thereby departing from the scope of the invention.

Thus, the main traction group may equally well comprise several engines as one engine, as illustrated in the drawings.

I claim:

1. A diesel locomotive comprising a main traction engine capable of hauling a train, an auxiliary unit comprising a heat engine, an electric current generator and an electric traction motor and capable of supplying at least sufficient traction force for moving any train which the said main engine is called upon to haul, and means whereby the locomotive can be selectively driven either by the said main engine or by the said auxiliary unit.

2. A diesel locomotive comprising a main traction engine capable of hauling a train, an auxiliary unit capable of supplying at least sufficient traction force for moving any train which the said main engine is called upon to haul, the said auxiliary unit comprising a heat engine, electrical generator and electric traction motor, means for driving said generator from said heat engine to provide electricity for the motor and power transmission means connecting said motor in parallel with the said main engine whereby traction can be provided without turning the main engine, and means whereby the locomotive can be selectively driven either by the said main engine or by the said auxiliary unit, means being provided for connecting the auxiliary unit to ancillary equipment in the locomotive or on the train hauled thereby so as to supply energy to the said ancillary equipment.

3. A diesel locomotive according to claim 2, also including means for interrupting the supply of energy to the ancillary equipment when the energy demand for traction exceeds a predetermined value.

4. A diesel locomotive comprising a main traction engine capable of hauling a train, an auxiliary unit capable of supplying at least sufficient traction force for moving any train which the said main engine is called upon to haul, the said auxiliary unit comprising a heat engine an electrical generator and an electric traction motor, means for driving said generator from said heat engine to provide electricity for the motor and power transmission means connecting said motor is in series with the said main engine whereby traction is effected through the main engine shaft, and means whereby the locomotive can be selectively driven either by the said main engine or by the said auxiliary unit, the auxiliary unit also including means for connecting it to ancillary equipment in the locomotive or on the train hauled thereby so as to supply energy to the said ancillary equipment.

5. A diesel locomotive according to claim 4, having a free wheel device located between the said auxiliary unit and said main engine whereby, when the main engine is driving, the auxiliary unit is not driven thereby.

6. A diesel locomotive according to claim 4, also including means for interrupting the supply of energy to the ancillary equipment when the energy demand for traction exceeds a predetermined value.

7. A locomotive power plant comprising, in combination, a diesel engine, a power transmission connected to said engine, an electric generator, a complementary electric motor supplied from said electric generator, a drive connection between said motor and said diesel engine, a free wheel clutch in said drive connection to prevent said motor from being driven by said diesel engine, and an auxiliary independent internal combustion engine for driving said generator, said motor, when energized by said generator being effective to start and propel the locomotive while driving said diesel engine.

8. A locomotive power plant as defined in claim 7, in which said electric motor is mechanically connected to the crankshaft of the diesel engine to drive the locomotive through said crankshaft.

9. A locomotive power plant as defined in claim 7, in which said electric motor is mechanically connected to said power transmission between said diesel engine and the traction wheels of the locomotive.

10. A locomtive power plant as defined in claim 9, in which a further free wheel clutch is interposed between the crankshaft of the diesel engine and said electric motor to prevent said crankshaft from being rotated by said electric motor at operative speeds.

References Cited by the Examiner

UNITED STATES PATENTS

| | | | |
|---|---|---|---|
| 1,568,197 | 1/26 | Stumpf. | |
| 1,691,249 | 11/28 | Palmer | 105—35 |
| 2,085,897 | 7/37 | Burrows et al. | 105—62 X |
| 2,405,352 | 8/46 | Giger. | |

MILTON BUCHLER, *Primary Examiner.*

JULIUS E. WEST, LEO QUACKENBUSH,
*Examiners.*